Feb. 2, 1926.
J. N. LAUGHLIN ET AL
1,571,843
COFFEE URN CROWN
Filed July 20, 1925
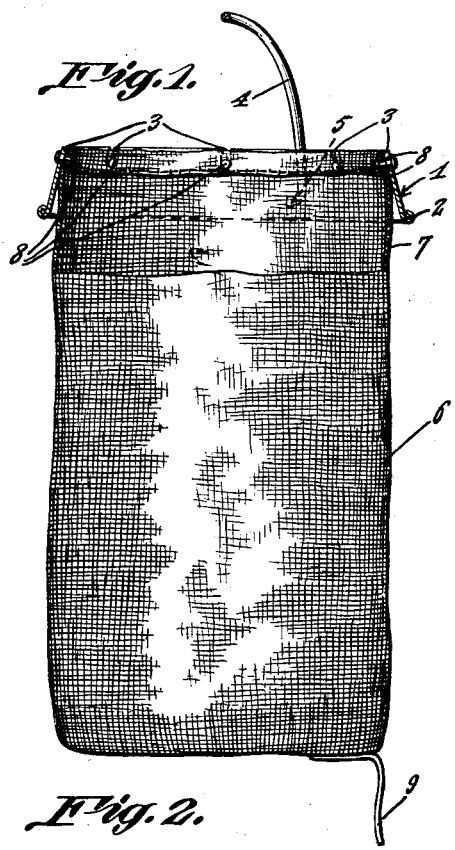
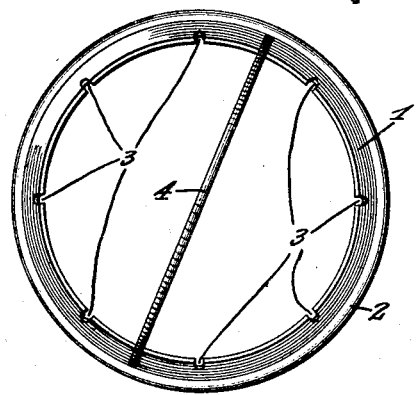
INVENTORS
J. N. Laughlin
AND F. J. Myers,
BY
Geo. P. Kimmel, ATTORNEY.

Patented Feb. 2, 1926.

1,571,843

UNITED STATES PATENT OFFICE.

JOHN N. LAUGHLIN AND FRED JOHN MYERS, OF NATIONAL MILITARY HOME, KANSAS.

COFFEE-URN CROWN.

Application filed July 20, 1925. Serial No. 44,881.

*To all whom it may concern:*

Be it known that we, JOHN N. LAUGHLIN and FRED J. MYERS, citizens of the United States, residing at National Military Home, in the county of Leavenworth and State of Kansas, have invented certain new and useful Improvements in Coffee-Urn Crowns, of which the following is a specification.

This invention relates to crowns for coffee urns and to the coffee bags used in connection with such crowns.

The primary object of this invention is the provision, in a manner as hereinafter set forth, of a crown and coffee bag which can be easily and quickly separated when it is necessary to empty the coffee grouts from the bag for the replacement of a clean bag and fresh coffee.

The invention contemplates the provision of a crown formed of a light clean metal such as aluminum, and of substantial height and of circular form. This crown is of greater diameter at the bottom than at the top and the top edge is provided with a series of spaced downwardly extending slots. A handle or bail is provided the ends of which bail are attached to the crown below the center thereof so that the crown will be top heavy when lifted by the bail and will thus be easy to invert when it is desired to remove the coffee bag therefrom. The bag associated with this crown is provided with a series of buttons around the mouth upon the outer side thereof, each of which buttons are designed to engage in one of the slots in the crown, the bag depending from the inside of the crown. The bag is provided with an ear or tab upon its bottom to be grasped by the person handling the same, when it is desired to invert the bag to empty the coffee grouts therefrom. When the bag is suspended from the crown and the two elements carried by the bail, the bag will automatically disengage from the crown when inverted, by the buttons slipping from the slots in the crown. Another and clean bag can thus be quickly and easily placed in position.

A final object of this invention is the provision, in a manner as hereinafter set forth, of a coffee urn crown and bag therefor which will be of simple construction, strong and durable, and inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 is a side elevation of a coffee bag constructed in accordance with this invention, showing the crown associated therewith in transverse sections.

Figure 2 is a top plan view of the crown, per se.

Referring now to the drawing in detail wherein like numerals of reference indicate corresponding parts throughout the several views the crown embodying a part of this invention is indicated generally by the numeral 1. This crown is preferably constructed of metal, preferably aluminum, and as shown is of substantial height and has the lower edge thereof rolled as at 2.

The crown is of greater diameter at the bottom than at the top as shown, and the top edge thereof is provided with the equidistantly spaced series of downwardly extending slots 3.

Extending across the top of the crown is a substantially semi-circular handle or bail 4, the ends of which are secured in the side of the crown as indicated at 5, at points beneath the center of gravity thus making the crown slightly top heavy when lifted by the bail.

Used in conjunction with this crown is a bag of linen or other desirable fabric 6, this bag having the top edge thereof reinforced as at 7 and having secured to the outer side thereof about the top edge a series of equidistantly spaced buttons 8. These buttons are spaced the same distance apart upon the bag as the slots 3 are spaced in the crown and each button is adapted to fit into a slot 3 in the crown allowing the bag to depend therethrough as shown in Figure 1. Secured to the bottom of the bag 6 is a tab or ear 9 adapted to be grasped by one when emptying the bag.

When the bag and crown are placed in position in a coffee urn, the rolled edge 2 of the crown rests upon the usual flange or rim formed upon the interior of a coffee urn for the support of the coffee bag crown and the bag 6 depends into the urn. When it is desired to empty the grouts from the bag, the crown and bag are lifted from the urn by the bail 4 and the bag is inverted by grasping the ear 9 and lifting the bottom upward. Owing to the top heavy manner in which the crown is supported from the bail 4 the inversion of the crown will be simple and when the same has been inverted the bag will immediately become disconnected from the crown by the buttons 8 slipping from the slots 3 allowing the bag to slip through the crown so that a fresh bag can be attached thereto.

From the foregoing description it will be readily seen that there has been provided an improved coffee urn crown and bag which while being of simple construction is serviceable and efficient and is much easier cleared of a dirty bag for the replacement thereof by a fresh one than is the case with coffee urn crowns in present use.

Having thus described our invention what we claim is:—

1. A coffee urn crown of the character set forth, comprising an annular member of greater diameter at the bottom than at the top and having a series of spaced slots formed in the top edge thereof for the support of a coffee bag, and a bail overlying and secured to the member.

2. A coffee urn crown of the character set forth comprising, an annular metallic member of greater diameter at the bottom than at the top and having a series of spaced slots formed in the top edge thereof for the support of a coffee bag, and a bail overlying the member, the terminal ends of said bail being secured in the side of the crown beneath the center of gravity thereof.

3. A coffee urn attachment of the character set forth comprising, an annular metal crown member of substantial height and of greater diameter at the bottom than at the top and having a series of downwardly extending spaced slots formed in the top edge thereof, a bail secured to said crown, a coffee bag adapted to extend through said crown, and buttons secured about the top of said bag upon the outside thereof, each adapted to engage in a slot to suspend the bag from the crown.

In testimony whereof, we affix our signatures hereto.

JOHN N. LAUGHLIN.
FRED JOHN MYERS.